United States Patent [19]

Ichikawa et al.

[11] Patent Number: 5,037,699

[45] Date of Patent: Aug. 6, 1991

[54] HEAT-RESISTANT, CORROSION-RESISTANT INORGANIC COMPOSITE BODIES AND PROCESS FOR PREPARING THE SAME

[75] Inventors: Hiroshi Ichikawa; Shiro Mitsuno, both of Yokohama, Japan

[73] Assignee: Nippon Carbon Co., Ltd., Tokyo, Japan

[21] Appl. No.: 506,426

[22] Filed: Apr. 9, 1990

[30] Foreign Application Priority Data

Apr. 14, 1989 [JP] Japan .................................. 1-93202

[51] Int. Cl.$^5$ ............................................... B32B 9/04
[52] U.S. Cl. .................................... 428/408; 428/447
[58] Field of Search ............... 428/688, 701, 702, 408, 428/447; 427/113, 115, 126.1, 294, 226, 255.1, 255.3, 255.4

[56] References Cited

U.S. PATENT DOCUMENTS

| | | | |
|---|---|---|---|
| 4,418,097 | 11/1983 | Misra | 427/397.7 |
| 4,454,177 | 6/1984 | Feist | 427/294 |
| 4,753,855 | 6/1988 | Haluska et al. | 428/688 |

Primary Examiner—Merrell C. Cashion, Jr.
Assistant Examiner—D. S. Nakarani
Attorney, Agent, or Firm—Bucknam and Archer

[57] ABSTRACT

A heat-resistant, corrosion-resistant inorganic composite body prepared by impregnating a heat-resistant inorganic compound body with at least one member selected from organosilicon compounds, metal alcoholates and organosilicon compound-metal alcoholate copolymers and then heat treating the thus impregnated body; and a process for preparing said heat-resistant, corrosion-resistant inorganic composite body.

4 Claims, No Drawings

HEAT-RESISTANT, CORROSION-RESISTANT INORGANIC COMPOSITE BODIES AND PROCESS FOR PREPARING THE SAME

BACKGROUND OF THE INVENTION

1. Field of the Invention

This invention relates to heat-resistant, corrosion-resistant inorganic composite bodies and a process for the preparation thereof and more particularly it relates to such inorganic composite bodies which may suitably be used as various articles under high-temperature and highly oxidizing conditions and are superior in various properties such as oxidation wear-resistance and heat-resistant strength, said various articles including pipes for blowing a gas therethrough into a molten metal, an article (such as a crucible for melting a metal therein) contacting with a molten metal, and electrodes for use in making electric furnace steal. The terms "oxidation-wear resistance" and "heat-resistant strength" are intended to mean "wear resistance under oxidizing conditions" and "strength under high temperature conditions" respectively.

2. Prior Art

Heat-resistant, corrosion-resistant inorganic composite bodies, such as an article contacting with a molten metal, which are used under high-temperature and highly oxidizing conditions, include heat-resistant inorganic compound bodies, such as artificial graphite bodies and C/C composites, which are composed mainly of carbon and/or graphite, and said bodies impregnated with a phosphoric acid compound such as phosphoric acid and salts thereof or coated with silicon dioxide ($SiO_2$) or a metal oxide, such as alumina ($Al_2O_3$), by plasma irradiation or the like.

However, the above-mentioned heat-resistant inorganic compound bodies composed mainly of carbon and/or graphite are not fully satisfactory in oxidation wear-resistance and heat-resistant strength and are difficult to use stably for a long period of time as an article contacting with a molten metal. Said heat-resistant inorganic compound bodies will be somewhat improved in oxidation wear-resistance by impregnating with a phosphoric acid compound or coating with a metal oxide, whereby heat-resistant and corrosion-resistant inorganic composite bodies having fully satisfactory properties cannot be obtained.

SUMMARY OF THE INVENTION

In view of the above disadvantages, an object of this invention is to provide a new heat-resistant, corrosion-resistant inorganic composite body which is excellent in various properties such as oxidation wear-resistance and heat-resistant strength and may be used stably for a long period of time as an article contacting with a molten metal.

Another object of this invention is to provide a process for preparing said new heat-resistant, corrosion-resistant inorganic composite body.

In attempts to achieve these objects, the present inventors made intensive studies and found that a heat-resistant inorganic compound body is impregnated with at least one compound selected from the group consisting of specific organosilicon compounds, specific metal alcoholates and specific organosilicon compound-metal alcoholate copolymers, and then further heat treated thereby to obtain a new heat-resistant, corrosion-resistant inorganic composite body which is excellent in properties such as oxidation-wear resistance and heat-resistant strength. This invention is based on the above finding or discovery.

The new heat-resistant, corrosion-resistant inorganic composite body of this invention may be obtained by:

(I) impregnating a heat-resistant inorganic compound body with at least one member of compound selected from the group consisting of (A) organosilicon compounds having a polycarbosilane skeleton as the main skeleton and being preferably straight-chain ones, represented by the general formula (1)

wherein $R_1$ and $R_2$ are each an alkyl group preferably having 1–6, more preferably having 1–3 carbon atoms, phenyl group or hydrogen atom and may be identical with, or different from, each other; and m is an integer of 5–50, (B) metal alcoholates represented by the general formula (2)

wherein $M_1$ is zirconium, aluminium, silicon or titanium, $R_3$ is an alkyl group preferably having 1–6, more preferably having 1–3 carbon atoms, phenyl group or hydrogen atom, and x is 3 or 4, and (C) organosilicon compound-metal alcoholate copolymers having a modified polycarbosilane skeleton as the main skeleton, represented by the general formula (3)

wherein $M_2$ is zirconium, aluminium, silicon or titanium; $R_4$, $R_5$ and $R_6$ are each an alkyl group preferably having 1–6, more preferably having 1–3 carbon atoms, phenyl group or hydrogen atom and may be identical with, or different from, one another; y is 2 or 3; and n is an integer of 5–50, and then (II) heat treating said heat-resistant inorganic compound body so impregnated.

This invention will be explained hereunder in more detail.

The compound with which said hear-resistant inorganic compound body is impregnated is at least one member of compound selected from said compounds (A), (B) and (C) as explained above.

Among these compounds (A), (B) and (C), the compound (C), which is an organosilicon compound-metal alcoholate copolymer, may be obtained by subjecting at least one kind of the organosilicon compounds (A) and at least one kind of the metal alcoholates (B) to polycondensing reaction at an elevated temperature in an inert atmosphere. There are no particular limitations set on the combination of the compounds (A) and (B) which are used as starting compounds, and these compounds (A) and (B) may suitably be selected depending on a desired copolymer (C) to be obtained. The mixing ratio between the organosilicon compound (A) and the metal alcoholate (B) is preferably 0.1–8.0 and particularly preferably 0.25–4.0 since the use of the latter mixing ratio will tend to result in the production of a copolymer having more improved oxidation resistance and more improved corrosion resistance to a molten metal. The conditions, such as the inert atmosphere, temperature and reaction time, under which said starting compounds (A) and (B) are polycondensed, are so suitably selected that the polycondensing reaction proceeds efficiently thereby to produce a copolymer (C), the end product, satisfactorily; the atmosphere, temperature and time are, for example, a nitrogen atmosphere, 100°–500° C. and 0.1–50 hours, respectively.

The heat-resistant inorganic compound body used in this invention may be a conventionally used one only if the conventionally used one is a porous heat-resistant inorganic compound body. A heat-resistant inorganic compound body composed mainly of carbon and/or graphite is preferable, and an artificial graphite body or a C/C composite is particularly preferable. The term "body" used herein is intended to mean a body which has been formed in compliance with the form of an article (end product) of this invention to be obtained.

There will be shown hereunder a general process for preparing the heat-resistant inorganic compound body used in this invention.

The starting material used in preparing the above inorganic compound body is at least one member selected from coke powder, carbon powder and graphite powder each of which may, if necessary, be incorporated with SiC powder or alumina powder, or is at least one member selected from carbon fibers, graphite fibers, SiC fibers and alumina fibers. Said starting material is incorporated with as a binder a resin, such as a phenol resin or furan resin, or pitch which will be carbonized by firing, molded into a desired shape and then fired at 700°–1200° C. for carbonization. The carbonaceaus molding so obtained may be used as a heat-resistant inorganic compound body in this invention. In addition, a molding obtained by graphitizing at 2000°–3000° C. the above carbonaceous molding is preferable for use in this invention, and, further, a molding obtained by repeating plural times such impregnation with the resin or pitch, such carbonization and such graphitization as above is particularly preferable.

As previously mentioned, the heat-resistant and corrosion-resistant inorganic composite bodies of this invention are characterized in that they are obtained by impregnating said starting heat-resistant inorganic compound body with at least one member selected from the group consisting of said compounds (A), (B) and (C) and then heat treating the thus impregnated body.

There will be explained hereunder a preferable process for preparing the heat-resistant and corrosion-resistant inorganic composite bodies of this invention.

First of all, the starting heat-resistant inorganic compound body is impregnated with at least one member selected from the compounds (A), (B) and (C). As to this impregnation, the starting inorganic compound body is placed in a vessel such as an autoclave, the vessel is evacuated to an extent that its inner pressure is decreased to 10 Torr or lower, a suitable amount of the impregnant (A), (B) and/or (C) is injected into the vessel and an inert gas such as nitrogen is then introduced thereinto, after which the pressure of the inert gas in the vessel is raised to 1–20 kg/cm$^2$ and then maintained at not higher than 100° C. for 1–100 hours to complete the impregnation. In a case where it is difficult to impregnate the starting inorganic compound body with the impregnant, the impregnant may be incorporated with an organic solvent such as xylene in an amount of not higher than 50% by weight of the impregnant for facilitating the impregnation.

Then, the starting body so impregnated is heat treated to obtain a heat-resistant, corrosion-resistant inorganic composite body of this invention. As to this heat treatment, it is preferable that said starting body so impregnated is heated at a temperature-raising rate of 5°–30° C./hr to 100°–700° C. in an oxidizing atmosphere such as air and then further heated at a temperature-raising rate of 100°–250° C./hr to 150°–2500° C. in a non-oxidizing atmosphere such as nitrogen.

In cases where heat treatment is effected under operational conditions other than the above ones used in this invention, no desired heat-resistant, corrosion-resistant inorganic composite bodies undesirably tend to be obtained.

There will be obtained desired heat-resistant, corrosion-resistant inorganic composite bodies of this invention even by carrying out the above impregnation and heat treatment one time each. In addition, there will preferably be obtained further desired inorganic composite bodies of this invention by carrying out the above impregnation and heat treatment several times each thereby enabling the impregnant to be impregnated more highly densely into the pores of the starting inorganic compound body to be impregnated.

The heat-resistant, corrosion-resistant inorganic composite bodies of this invention so obtained have a widely inhibited oxidation-wear rate at about 600° C. and enhanced flexural strength as compared with conventional ones such as the starting heat-resistant inorganic compound body and this body impregnated with a phosphoric acid compound. Further, the heat-resistant, corrosion-resistant inorganic composite bodies of this invention obtained from a starting heat-resistant inorganic compound body having electrical conductivity such as a graphite body, are more excellent in oxidation-wear resistance and heat-resistant strength than conventional electrodes for electric furnace steel and are useful as electrodes for electric furnace steel.

DESCRIPTION OF THE PREFERRED EMBODIMENTS

This invention will be better understood by the following examples in comparison with the following comparative Examples.

EXAMPLES 1–8

The compounds (impregnants) to be impregnated into starting heat-resistant inorganic compound bodies indicated in Table 1, which impregnants are also indicated in Table 1, were mixed with xylene in the respective ratios indicated in Table 1.

The copolymers (C1–C6) used in Examples 3–8 were prepared by mixing together the starting compounds indicated in Table 2 in the respective ratios indicated in the same Table and then polycondensing the respective mixtures in a nitrogen atmosphere under reaction conditions indicated in the above Table.

The artificial graphite bodies indicated in Table 1, which are used as starting heat-resistant inorganic compound bodies, were previously subjected to supersonic washing in acetone for 10 minutes and then dried at 250° C. in air for one hour.

The artificial graphite bodies so washed and dried were each placed in an autoclave which was then reduced to $10^{-1}$ Torr in inner pressure. Thereafter, the mixtures of said compounds (impregnants) and xylene were each poured into the evacuated autoclave, nitrogen gas was blown thereinto and said bodies were impregnated respectively with said compounds (impregnants) under the respective impregnating conditions shown in Table 1.

The thus impregnated artificial graphite bodies were heat treated in air under the respective conditions shown in Table 1 and then further heat treated in a nitrogen atmosphere under the respective conditions indicated in the same Table.

The above impregnation and heat treatment were each repeated plural times to obtain heat-resistant, corrosion-resistant inorganic composite bodies respectively of Examples 1-8.

The heat-resistant, corrosion-resistant inorganic composite bodies of Examples 1-8 were measured for their flexural strength by autograph. They were maintained at 600° C. in air for 50 hours to measure their oxidation-wear rate. The results are as shown in Table 3.

Further, the heat-resistant, corrosion-resistant inorganic composite bodies of Examples 4-8 were each made into a tube for blowing a gas therethrough which was fitted in a furnace for highly purifying aluminium alloys. The gas was repeatedly blown through the tube into a molten aluminium alloy heated at 720°-740° C. (one time every 5 minutes); it was measured in this manner how many times the gas could be repeatedly blown into the molten alloy before the tube became useless by its oxidation wear and decrease in strength due to the molten alloy. The results are also as shown in Table 3.

COMPARATIVE EXAMPLES 1-2

In comparative Example 1, the same washed artificial graphite body as used in Examples 1-8 was used without such impregnation and heat treatment as mentioned above to measure its flexural strength and oxidation-wear rate in the same manner as in Examples 1-8. In comparative Example 2, the procedure of comparative Example 1 was followed that the same washed artificial graphite body was impregnated with phosphoric acid in the same manner as in Examples 1-8 under the impregnation treating conditions indicated in Table 1. The results are as indicated in Table 3.

In addition, the artificial graphite body of Comparative Example 1 was used as a gas blowing tube of a furnace for highly purifying aluminium alloys to measure in the same manner as in Examples 4-8 how many times the gas could be repeatedly blown through the tube. The result is also as shown in Table 3.

TABLE 1

| Example Comp. Ex. | Heat-resistant inorganic compound body | Compound (Impregnant) | Conc. of xylene (wt. %) | Impregnation treating conditions | | |
|---|---|---|---|---|---|---|
| | | | | Pressure Kg/cm² | Temp. °C. | Time hr |
| Example 1 | Artificial graphite body 1*¹ | Polycarbosilane (A1)*⁴ | 30 | 5 | 20 | 24 |
| Example 2 | Artificial graphite body 1*¹ | Tetrabutoxyzirconium (B1)*⁵ | 12 | 10 | 20 | 15 |
| Example 3 | Artificial graphite body1*¹ | Polycarbosilane-tetrabutoxyzirconium copolymer (C1) | 20 | 10 | 20 | 15 |
| Example 4 | Artificial graphite body 2*² | Polycarbosilane-tetrabutoxytitanium copolymer (C2) | 25 | 10 | 20 | 15 |
| Example 5 | Artificial graphite body 2*² | Polycarbosilane-tetrabutoxytitanium copolymer (C3) | 25 | 10 | 20 | 15 |
| Example 6 | Artificial graphite body 2*² | Polycarbosilane-tetrabutoxytitanium copolymer (C4) | 25 | 10 | 20 | 15 |
| Example 7 | Artificial graphite body 2*² | Polycarbosilane-tetrabutoxytitanium copolymer (C5) | 25 | 10 | 20 | 15 |
| Example 8 | Artificial graphite body 2*² | Polycarbosilane-tetrabutoxytitanium copolymer (C6) | 25 | 10 | 20 | 15 |
| Comp. Ex. 1 | Artificial graphite body 1,2*³ | — | — | — | — | — |
| Comp. Ex. 2 | Artificial graphite body 1*¹ | Phosphoric acid | — | 5 | 20 | 15 |

| Example Comp. Ex. | Heat treating conditions | | | | Times of impregnation and of heat treatment |
|---|---|---|---|---|---|
| | In air | | In nitrogen atomosphere | | |
| | Temp.-raising rate °C./hr | Max. temp. °C. | Temp.-raising rate °C./hr | Max. temp. °C. | |
| Example 1 | 10 | 250 | 200 | 1000 | 2 |
| Example 2 | 10 | 250 | 200 | 1000 | 2 |
| Example 3 | 20 | 350 | 180 | 1150 | 3 |
| Example 4 | 20 | 350 | 180 | 1150 | 3 |
| Example 5 | 20 | 350 | 180 | 1150 | 3 |
| Example 6 | 20 | 350 | 180 | 1150 | 3 |
| Example 7 | 20 | 350 | 180 | 1150 | 3 |
| Example 8 | 20 | 350 | 180 | 1150 | 3 |
| Comp. Ex. 1 | — | — | — | — | — |

TABLE 1-continued

| | Comp. Ex. 2 | — | — | — |

*[1] Produced by Nippon Carbon Co., Ltd.; Tradename, EG-38; Bulk specific gravity, 1.70; Size, 20 mmϕ × 300 mm length.
*[2] Produced by Nippon Carbon Co., Ltd.; Tradename, EG-38; Bulk specific gravity, 1.70; Size, 120 mmϕ × 400 mm length.
*[3] Artificial graphite body 1 (*[1]) was used to measure flexural strength and oxidasion-wear rate, and body 2(*[2]) used to measure performance as gas blowing tube.
*[4] Average molecular weight, about 2000; Basic skeleton, —(SiHCH₃CH₂)—.
*[5] Structural formula, Zr (OC₄H₉)₄.

TABLE 2

| Example | Compound (C) (Impregnant) | Starting compounds for preparing Compound (C) Organosilicon compound (A) | Metal alcoholate (B) | Mixing ratio (A/B) Wt. ratio | Polycondensing reaction conditions Temp. (°C.) | Time (hr) |
|---|---|---|---|---|---|---|
| Example 3 | Polycarbosilane-tetrabutoxyzirconium copolymer (C1) | Polycarbosilane (A1)*[1] | Tetrabutoxyzirconium (B1)*[3] | 4/1 | 200 | 1.0 |
| Example 4 | Polycarbosilane-tetrabutoxytitanium copolymer (C2) | Polycarbosilane (A2)*[2] | Tetrabutoxytitanium (B2)*[4] | 1/10 | 250 | 1.5 |
| Example 5 | Polycarbosilane-tetrabutoxytitanium copolymer (C3) | Polycarbosilane (A2)*[2] | Tetrabutoxytitanium (B2)*[4] | 1/4 | 250 | 1.5 |
| Example 6 | Polycarbosilane-tetrabutoxytitanium copolymer (C4) | Polycarbosilane (A2)*[2] | Tetrabutoxytitanium (B2)*[4] | 1/1 | 250 | 1.5 |
| Example 4 | Polycarbosilane-tetrabutoxytitanium copolymer (C5) | Polycarbosilane (A2)*[2] | Tetrabutoxytitannium (B2)*[4] | 4/1 | 250 | 1.5 |
| Example 8 | Polycarbosilane-tetrabutoxytitanium copolymer (C6) | Polycarbosilane (A2)*[2] | Tetrabutoxytitanium (B2)*[4] | 8/1 | 250 | 1.5 |

*[1] Average molecular weight, about 2000; Basic skeleton, —(SiHCH₃CH₂)—
*[2] Average molecular weight, about 2500; Basic skeleton, —(SiHCH₃CH₂)—
*[3] Structural formula, Zr (OC₄H₉)₄
*[4] Structural formula, Ti (OC₄H₉)₄

TABLE 3

| | Flexural strength [kg/cm²] | Oxidation-wear rate [wt. %] | performance as gas blowing pipe (Times of repeated use) |
|---|---|---|---|
| Example 1 | 530 | 11.3 | — |
| Example 2 | 540 | 10.9 | — |
| Example 3 | 560 | 9.5 | — |
| Example 4 | 550 | 12.5 | 338 |
| Example 5 | 560 | 9.1 | 399 |
| Example 6 | 567 | 9.1 | 406 |
| Example 7 | 563 | 9.2 | 392 |
| Example 8 | 544 | 12.8 | 343 |
| Comp. Ex. 1 | 400 | 30.9 | 60 |
| Comp. Ex. 2 | 400 | 25.2 | — |

Note: Comp. Ex. = Comparative Example

EXAMPLE 9 AND COMPARATIVE EXAMPLE 3

A plain-weave cloth consisting of carbon filaments 6000 f was impregnated with a phenol resin in an amount of 40% by weight thereof to prepare a prepreg. Twenty of prepregs so prepared were laminated with one another, molded and cured at 150° C., carbonized at 800° C. and then graphitized at 2000° C. to obtain a plate-like molding having a size of 5×30×300 mm. The thus obtained plate-like molding was impregnated with pitch, carbonizing at 800° C. the pitch-impregnated molding, repeating these impregnation and carbonization two more times, and further heating to 2000° C. the thus carbonized molding to again graphitize it thereby obtaining a C/C composite. The composite so obtained had a bulk specific gravity of 1.60.

The C/C composite so obtained was placed in an autoclave which was then reduced in pressure to 10⁻¹ Torr. Thereafter, tetrabutoxytitanium (B2) was poured, without mixing with an organic solvent, into the autoclave, nitrogen gas was introduced into the autoclave to pressurize the inside thereof to 10 kg/cm², and the autoclave was then maintained at this pressure and 40° C. for 15 hours thereby to impregnate the C/C composite with the tetrabutoxytitanium (B2).

Subsequently, the C/C composite so impregnated was heated in air at a temperature-raising rate of 10° C./hr to 250° C. and then further heated at a temperature-raising rate of 200° C./hr to 1000° C. in a nitrogen atmosphere thereby to obtain a heat-resistant, corrosion resistant inorganic composite body of Example 9.

The thus obtained heat-resistant, corrosion-resistant inorganic composite body (Example 9) and the above C/C composite prepared without impregnation and heat treatment (Comparative Example 3) were each measured for flexural strength and oxidation-wear rate in the same manner as in Examples 1-8 with the results being shown in Table 4.

TABLE 4

| | Flexural strength (kg/mm²) | Oxidation-wear rate (wt. %) |
|---|---|---|
| Example 9 | 18 | 12.8 |
| Comp. Ex. 3 | 16 | 55.2 |

EXAMPLE 10 AND COMPARATIVE EXAMPLE 4

An artificial graphite electrode (produced by Nippon Carbon Co., Ltd. and having a bulk specific gravity of 1.71, a flexural strength of 145 kg/cm² and a size of 16 inchϕ×6 feet length) was charged in an autoclave which was then reduced in pressure to 5 Torr. Thereafter, a mixture of acetone with the same polycarbosilane-tetrabutoxyzirconium copolymer (C1) as used in Example 3 (said mixture containing 20 wt. % of acetone) was poured into the autoclave, nitrogen gas was introduced thereinto to increase the pressure to 5 kg/cm², and the autoclave so charged was then maintained at this pressure and 40° C. for 24 hours thereby to impregnate the artificial graphite electrode with the copolymer (C1).

The thus impregnated artificial graphite electrode was heated in air at a temperature-raising rate of 10° C./hr to 250° C. and further heated in a nitrogen atmosphere at a temperature-raising rate of 250° C./hr to 1000° C. thereby to obtain a heat-resistant, corrosion-resistant inorganic composite body of Example 10.

The thus obtained heat-resistant, corrosion-resistant inorganic composite body (Example 10) and an artificial graphite electrode (comparative Example 4) which was not subjected to such impregnation and heat treatment as above, were each continuously used as an electrode in a 30 t steel-making electric furnace for 10 days, during which electrode consumption (expressed in terms of "kg of electrode consumed/ton of good ingot produced") was measured. The results are as shown in Table 5.

TABLE 5

| | Electrode consumption (kg/ton of good ingot) |
|---|---|
| Example 10 | 2.6 |
| Comp. Ex. 4 | 2.8 |

As is apparent from Table 3, all the new heat-resistant and corrosion-resistant inorganic composite bodies obtained by impregnating an artificial graphite body with a specific organosilicon compound (Example 1), a specific metal alcoholate (Example 2) or a specific organosilicon compound-metal alcoholate copolymer (Examples 3-8) and then heat treating the thus impregnated artificial graphite body, as compared with an artificial graphite body (Comparative Example 1) which has conventionally been used as a heat-resistant and corrosion-resistant inorganic composite body or such a body (Comparative Example 2) impregnated with phosphoric acid, are very excellent in oxidation-wear resistance (the oxidation-wear of the new bodies being less than about ½ of that of the conventional one) and enhanced flexural strength (the flexural strength of the new bodies being at least 1.3 times that of the conventional one).

Further, the heat-resistant, corrosion-resistant inorganic composite bodies of Examples 4-8 were able to be used for a long period of time as gas blowing tubes for highly purifying aluminium alloys and could be repeatedly used, the time of repetition being at least 5 times that of conventional graphite gas blowing tubes (Comparative Example 1).

As is clear from Table 4, even a new heat-resistant, corrosion-resistant inorganic composite body (Example 9) prepared by impregnating a C/C composite, which was a kind of conventional heat-resistant, corrosion-resistant inorganic composite body, with a specific organosilicon compound-metal alcoholate copolymer and then heat treating the thus impregnated C/C composite, is remarkably improved in oxidation-wear resistance and flexural strength as compared with a C/C composite (Comparative Example 3) without having undergone such impregnation and heat treatment.

Furthermore, as is apparent from Table 5, a new artificial graphite electrode (Example 10) obtained by impregnating a conventional artificial graphite electrode with a specific organosilicon compound-metal alcoholate copolymer and then heat treating the thus impregnated electrode, exhibited excellent electrode consumption as compared with a conventional artificial graphite electrode (Comparative Example 4) when these two electrodes were each used as such in an electric furnace for making steel.

EFFECTS OF THE INVENTION

As is clear from the above description, this invention characterized by impregnating a heat-resistant inorganic compound body with at least one member selected from the group consisting of specific organosilicon compounds, specific metal alcoholates and specific organosilicon compound-metal alcoholate copolymers and then heat treating the thus impregnated body, makes it possible to obtain a new heat-resistant, corrosion-resistant inorganic composite body which is excellent in various properties such as oxidation-wear resistance and heat-resistant strength and is enabled to be used stably for a long period of time as articles contacting with a molten metal.

Particularly, in a case where an electrically conductive body, such as a graphite body, is used as the heat-resistant inorganic compound body in this invention, there will be obtained an electrode for making electric furnace steel, the electrode so obtained being improved in oxidation-wear resistance, etc. while maintaining its electrical conductivity and also being excellent in electrode consumption.

Thus the heat-resistant, corrosion-resistant inorganic composite bodies of this invention may suitably be used as an article contacting with a molten metal, an electrode for making electric furnace steel, or the like; and the process of this invention may suitably be used for producing the heat-resistant, corrosion-resistant inorganic composite body of this invention.

What is claimed is:

1. A heat-resistant, corrosion-resistant inorganic composite body obtained by:
   (a) impregnating a heat-resistant inorganic compound body with at least one member selected from the group consisting of
   (1) organosilicon compounds having a polycarbosilane skeleton as the main skeleton of formula

(1)

wherein $R_1$ and $R_2$ are each an alkyl group of 1–6 carbon atom, phenyl or hydrogen and are identical or different from each other; and m is an integer of 5–50, and
   (2) an organosilicon compound-metal alcoholate copolymer having a modified polycarbosilane skeleton as the main skeleton of formula (2)

(2)

wherein $M_2$ is zirconium, aluminium, silicon or titanium; $R_4$, $R_5$ and $R_6$ are each an alkyl group of 1–6 carbon atoms, phenyl or hydrogen and are identical or different from one another; y is 2 or 3; and n is an integer of 5–50, (b) heating the thus impregnated heat-resistant inorganic compound body to 100°–700° C. in an oxidizing atmosphere and then (c) heating the thus heated inorganic compound body to 150°–2500° C. in a non-oxidizing atmosphere.

2. A heat-resistant, corrosion-resistant inorganic composite body according to claim 1, wherein said heat-resistant inorganic compound body consists of carbon.

3. A heat-resistant, corrosion-resistant inorganic composite body according to claim 1, wherein said heat-resistant inorganic compound body consists of graphite.

4. A heat-resistant, corrosion-resistant inorganic composite body according to claim 1, wherein said heat-resistant inorganic compound body consists of carbon and graphite.

* * * * *